US012636906B2

(12) United States Patent
Von Czarnowski et al.

(10) Patent No.: US 12,636,906 B2
(45) Date of Patent: May 26, 2026

(54) MULTI-PIECE EXTRUSION SPOKES FOR WHEELS

(71) Applicant: Delta Wheels LLC, Orchard Lake, MI (US)

(72) Inventors: Armin Von Czarnowski, Orchard Lake, MI (US); Peter Von Czarnowski, Orchard Lake, MI (US); Dirk Uffelmann, Ering (DE)

(73) Assignee: Delta Wheels LLC, Orchard Lake, MI (US)

( * ) Notice: Subject to any disclaimer, the term of this patent is extended or adjusted under 35 U.S.C. 154(b) by 907 days.

(21) Appl. No.: 17/695,595

(22) Filed: Mar. 15, 2022

(65) Prior Publication Data

US 2022/0288968 A1 Sep. 15, 2022

Related U.S. Application Data

(60) Provisional application No. 63/210,372, filed on Jun. 14, 2021, provisional application No. 63/161,379, filed on Mar. 15, 2021.

(51) Int. Cl.
B60B 1/14 (2006.01)
B60B 1/08 (2006.01)

(52) U.S. Cl.
CPC .................. B60B 1/14 (2013.01); B60B 1/08 (2013.01); *B60B 2900/112* (2013.01)

(58) Field of Classification Search
CPC .... B60B 1/00; B60B 1/06; B60B 1/08; B60B 1/10; B60B 1/14
See application file for complete search history.

(56) References Cited

U.S. PATENT DOCUMENTS

| | | | |
|---|---|---|---|
| 416,190 A | 12/1889 | Terry | |
| 787,815 A * | 4/1905 | Adams | B60B 1/00 301/66 |
| 1,371,382 A | 3/1921 | Ledwinka | |
| 1,487,754 A * | 3/1924 | Murray | B60B 1/00 301/79 |
| 3,057,664 A | 10/1962 | Lyon | |
| 3,346,301 A | 10/1967 | Hurst, Jr. et al. | |
| 4,153,267 A | 5/1979 | Hilber | |
| 4,181,365 A | 1/1980 | Kawaguchi et al. | |
| 4,319,785 A | 3/1982 | Sato et al. | |
| 4,749,235 A | 6/1988 | McDougall | |
| 6,439,671 B1 | 8/2002 | Lehnhardt et al. | |
| 7,346,984 B2 | 3/2008 | Baumgartner | |

(Continued)

FOREIGN PATENT DOCUMENTS

| | | | |
|---|---|---|---|
| CN | 101402301 | 4/2009 | |
| DE | 20108279 U1 * | 8/2001 | B60B 1/041 |
| WO | WO 2020/160487 | 8/2020 | |

OTHER PUBLICATIONS

"Carbon-fiber-reinforced polymers," Wikipedia, retrieved from https://en.wikipedia.org/wiki/Carbon-fiber-reinforced_polymers, retrieved on Mar. 12, 2022, 13 pages.

(Continued)

*Primary Examiner* — Kip T Kotter
(74) *Attorney, Agent, or Firm* — Sheridan Ross P.C.

(57) ABSTRACT

A wheel assembly is provided that includes spokes having one or more triangular prisms positioned between inner and outer surfaces of the spokes that impart additional strength.

13 Claims, 10 Drawing Sheets

(56) References Cited

U.S. PATENT DOCUMENTS

| | | | |
|---|---|---|---|
| 7,615,171 B2 | 11/2009 | Schroeder et al. | |
| 7,891,745 B2 | 2/2011 | Nagao | |
| 9,561,686 B1 * | 2/2017 | Waldner | B60B 15/02 |
| 9,616,705 B2 | 4/2017 | Burlefinger et al. | |
| 11,780,263 B2 | 10/2023 | Rodgers et al. | |
| 2008/0303338 A1 | 12/2008 | Takeda et al. | |
| 2010/0096908 A1 * | 4/2010 | Nagao | B60B 1/14 |
| | | | 301/58 |
| 2014/0139011 A1 * | 5/2014 | Ko | B60B 5/02 |
| | | | 29/894.342 |
| 2015/0275336 A1 | 10/2015 | Fukuda | |
| 2017/0211708 A1 | 7/2017 | Kim | |
| 2017/0232498 A1 | 8/2017 | Zhang | |
| 2019/0010580 A1 | 1/2019 | Zhao et al. | |
| 2020/0180356 A1 | 6/2020 | Van Houten et al. | |
| 2020/0406671 A1 | 12/2020 | Denmead et al. | |

2022/0105746 A1    4/2022   von Czarnowski

OTHER PUBLICATIONS

"Metal foam," Wikipedia, retrieved from ttps://en.wikipedia.org/wiki/Metal_foam, retrieved on Mar. 13, 2022, 14 pages.

International Search Report and Written Opinion for International (PCT) Patent Application No. PCT/US2020/016236, dated Jul. 13, 2020 18 pages.

International Preliminary Report on Patentability for International (PCT) Patent Application No. PCT/US2020/016236, dated Aug. 12, 2021 14 pages.

International Preliminary Report on Patentability for International (PCT) Patent Application No. PCT/US2022/020410, dated Sep. 28, 2023 9 pages.

International Search Report and Written Opinion for International (PCT) Patent Application No. PCT/US2022/020410, dated Aug. 15, 2022 15 pages.

* cited by examiner

MULTI-PIECE EXTRUSION SPOKES FOR WHEELS

CROSS REFERENCE TO RELATED APPLICATION

The present application claims the benefits of U.S. Provisional Application Ser. No. 63/161,379, filed Mar. 15, 2021, and 63/210,372, filed Jun. 14, 2021, both entitled "Multi-Piece Extrusion Spokes for Wheels", each of which is incorporated herein by this reference in its entirety.

FIELD

The disclosure relates generally to wheel structures and particularly to inner wheel structures.

BACKGROUND

High-performance wheels are typically based on forgings or by flow-forming of a casted pre-forms. Those conventional high-performance wheels reveal load bearing in tension, compression, and bending mode. To utilize the material in the best weight to load ratio bending forces should be minimized. These principles are described in copending PCT/US2020/016236, filed Jan. 31, 2020, and incorporated herein by this reference, in which a triangular structure is proposed. The triangular structure can be realized by sheet, casted components, extruded components, composites or combinations thereof. This engineering principle is hereafter called "Delta Wheel" principle. In particular, the extruded solution requires the assembly of multiple parts.

SUMMARY

These and other needs are addressed by the various embodiments and configurations of the present disclosure.

In some embodiments, a wheel assembly can include:

a circular rim;

a hub member positioned at an axis of rotation of the circular rim; and a plurality of spokes radiating outwardly from an exterior surface of the hub member to an interior surface of the rim, wherein:

each of the plurality of spokes is removably connected to the hub member and the rim; and each of the plurality of spokes comprises a triangular prism or an interior space that is triangular in cross section, formed by, typically substantially planar, upper and lower surfaces of the respective spoke and a support member extending transversely between the upper and lower surfaces.

In some embodiments, a wheel assembly can include:

a circular rim; and a plurality of spokes radiating outwardly from a axis of rotation of the wheel assembly, wherein:

each of the plurality of spokes is removably connected to adjacent spokes to form a hub and to the rim; and each of the plurality of spokes comprises a space located interiorly of upper and lower surfaces of the respective spoke and a support member extending transversely between the upper and lower surfaces, the interior space having a triangular cross section along a length of the respective spoke.

The support member can be part of the hub member.

The support member can be positioned between the center hub and the rim, and the hub member can be formed by interconnected portions of the plurality of spokes. In this configuration, the plurality of spokes can be free of a discrete center hub member.

A first member can comprise first and second spokes and a center hub section, a second member can comprise third and fourth spokes and a first center second hub section, and the second member can comprise a central channel through which the first member passes to position the first and second hub sections in an overlapping relationship.

A selected spoke can comprise a first section connecting to the rim, a third section connecting to an adjacent first spoke, and a second section, positioned between the first and third sections, connecting to an adjacent second spoke, and the second section can comprise a slot to receive a third section of the adjacent second spoke.

The support member comprises plural truss-like members forming plural triangular prisms or interior spaces having a triangular in cross section.

A surface defining the triangular prism or triangular cross-section can comprise an irregularity forming a stress riser having a lower breaking point than a breaking point of other surfaces defining the triangular prism or interior space.

One or more surfaces of the triangular prism or interior space can comprise a surface treatment selected from the group consisting essentially of a coating, paint, anodizing, electropolishing or shot peening and laser peening and wherein the spokes attach to the hub member by a form press/fit scheme.

In some embodiments, this disclosure describes a method and sequence to integrate multiple extrusions into an inner wheel structure and how to join the inner wheel structure to the wheel rim.

Special features are described to improve usability and effectiveness of the Delta concept under real world conditions.

In an embodiment, a multi-piece assembly for an inner wheel structure is provided in which 3 or more extruded spokes connect a wheel rim and a center piece to bear the axel load of the vehicle.

The centerpiece can be integrated in the extruded spoke design, in two different concepts applying an even or uneven number of spokes. In this design no separate centerpiece is employed.

The material used can be aluminum, magnesium, specialty steel, reinforced composites, carbon fiber reinforced composites, pultrusion materials and laminates of different materials.

The spokes are preferably made from extruded materials; however, the disclosed geometries can be a forging, casting or fabricated by sheet metal using roll forming, rotary forming, bending, stamping or a combination of those. The direction of the extrusion can be tangential to the wheel circumference, parallel to the wheel axis or in radial direction of the wheel.

The extrusion chambers are preferably triangular shaped, or partially triangular shaped to minimize bending forces during cornering, circumscribing partitions (DDD) and (FFF).

The triangular extrusion can be subdivided in multiple chambers to improve the load distribution in the various load and crash cases.

The outer contour of the triangle can be irregular, such as with a kink to allow more clearance for the break. The kink is a type of stress riser and can be any sharp corner, groove, notch or acute change of section that causes stress concentrations under normal loadings.

An inner lamella, or layer or thin plate, might be applied to stabilize the Delta contour. This is particular favorable in side impact crash.

The individual elements as spokes and centerpiece of the wheel inner are designed in a form/press fit scheme, whereas the assembly is joined by a one-stage or two-stage looking feature.

The form-press-fit spoke to spoke or spoke to centerpiece can be secured by welding, adhesive or mechanical joining.

A spoke-to-rim weld preparation incorporates a form fit, for example undercuts to avoid stress concentration in the weld seam and heat affected zone.

Accommodative internal stress relief might be enforced by initial high forces.
(Trimming)

The spoke structure might accommodate a hub cap to balance the load distribution, improve aerodynamics and to allow additional aesthetic features.

The spoke-structure can be incorporated in an injection mold process, whereas the spoke structure provides the structural integrity and the injection molded component addresses design requirements, active cooling features, and low drag resistance.

An incorporated bullet proofed wheel-cap can be accomplished by an oversized disc attached to the spokes preferably by mechanical joining.

To avoid fretting corrosion relative motion must be minimized by adhesives, brazing, welding or multiple mechanical fastening. A surface treatment is reducing the fretting between the interleaved spokes. Suitable surface treatments are coatings, paints, anodizing, electropolishing or shot peening and laser peening.

The present disclosure can provide a number of advantages depending on the particular configuration. The inner wheel structures of this disclosure can be fabricated from extruded or metal sheet products, thereby reducing manufacturing costs.

These and other advantages will be apparent from this disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section(s) 112(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various embodiments of the disclosure, as illustrated by the drawings referenced below.

DETAILED DESCRIPTION

Multi Piece Extrusion Wheel

In a multi-piece extrusion wheel, the inner wheel structure includes a center piece and multiple spokes preferably from Al-extrusion profiles. The spokes can be manufactured by other operations like milling, casting or 3D printing. The material is preferably higher strength aluminum alloys but other materials as magnesium, steel, or reinforced plastics can be applied as well.

Figures 1A, 1B:
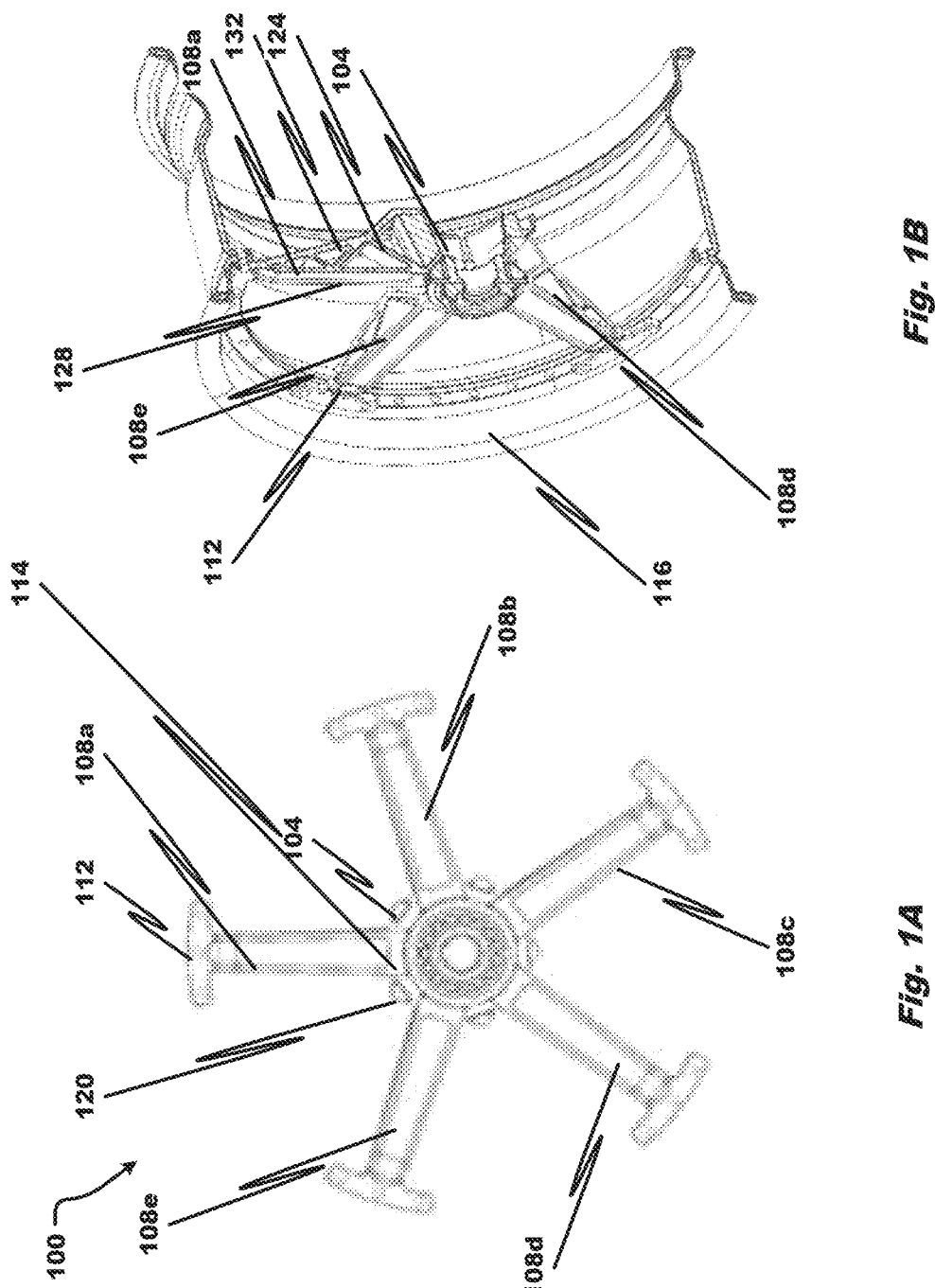
FIG. 1A is a front view of a hub and spoke structure according to an embodiment of the disclosure.
FIG. 1B is a perspective view of a partial cross section of the hub and spoke structure of FIG. 1A installed on a rim.

A center hub provides the base for the spokes. The design of the single components and the assembly will be described with reference to FIGS. 1A-B. FIGS. 1A-B depict the inner wheel structure 100 which includes a center hub 104 to which a plurality of spokes 108*a-e* are attached. A proximal end 114 of each spoke is attached to the center hub 104 by a plurality of bolts 120 or other suitable fasteners. A distal end of each spoke 108 has an interface 112 which is connected to a matching interface on the rim 116 by suitable fasteners, such as bolts, or other technique. The inner wheel structure 100 is assembled before it is mounted to the rim 116, which can be manufactured from metal or carbon fiber. FIG. 1B depicts, in cross section, a spoke 108*a* showing its angular, truss-like structure in which a series of planar interior members 124 are attached to an outer spoke face 128 and inner spoke face 132.

Figures 2A, 2B:
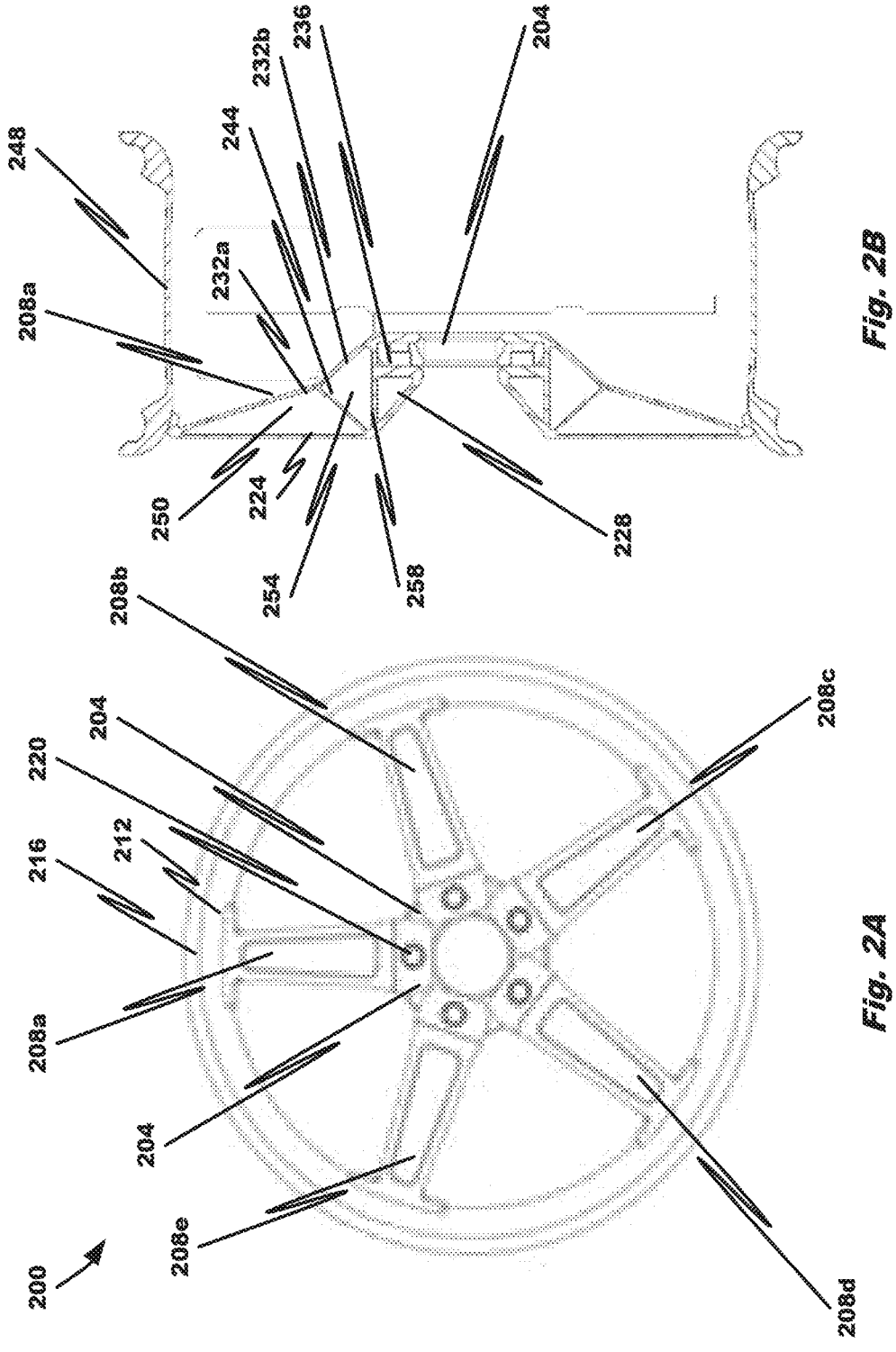
FIG. 2A is a front view a hub and spoke structure installed on a rim in accordance with an embodiment of the disclosure.
FIG. 2B is a side cross-section view of the hub and spoke structure of FIG. 2A along a plane including a rotational axis of the wheel assembly.

Another wheel design 200 is depicted in FIGS. 2A-B. As in the prior wheel design 100, a plurality of spokes 208*a-e* are separately attached by suitable fasteners 220 to a center hub 204 and attached at interfaces 212 to a matching interface 216 on an outer rim 248. FIG. 2B shows the spoke 208 fastened to the center hub 204 in cross section showing its interior truss-like structure of the spokes 208. Specifically, the spoke 208*a* comprises outer spoke faces 224 and 228 and inner spoke face 232. Truss members 244 are disposed interiorly of the outer and inner spoke faces 224, 228, and 232. The interface 236 shows the connection interface between the center hub 204 and spoke 208*a*. A first triangular prism 250 is defined by the outer spoke face 224, truss member 244, and inner spoke face 232*a*, and a second triangular prism 254 is defined by a cylindrical wall 258 of the center hub 204, truss member 244, and inner spoke face 232*b*.

Extrusion Geometry

The extrusion profile has the triangular cross section discussed above in connection with the truss-like members to ensure that tension and compression are the dominant load modes. To allow better clearance for the brake system the triangular structure can be divided in two or more sub triangles. Additional inner triangles or cross member can be employed to support the resistance to specific crash load cases. The extrusion reveals design elements which interfere with the center hub 204 to form a form-fit and press fit assembly, a mechanical joining, or a conventional weld.

The extrusion reveals design elements which interfere with the rim 248 to form a form-fit and press fit assembly, a mechanical joining, or a conventional weld.

Figures 3, 4, 5:
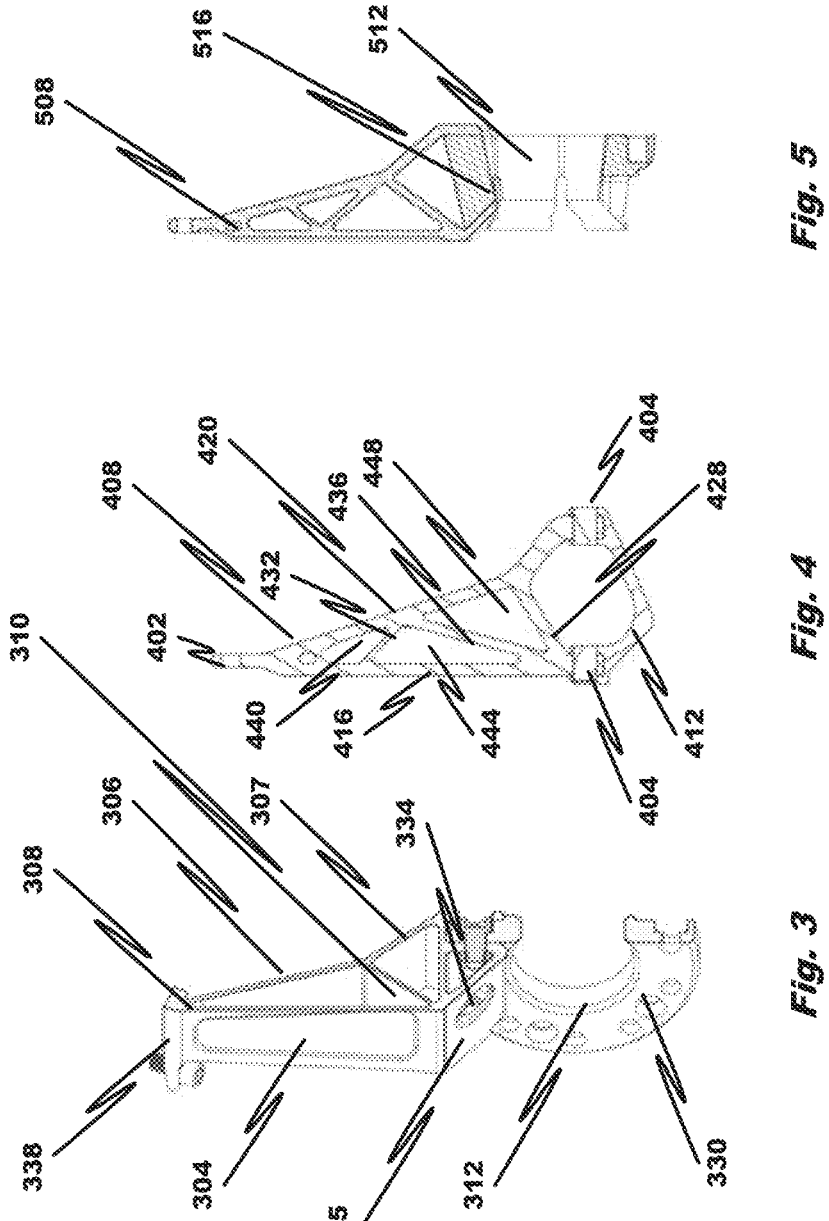
FIG. 3 is a perspective view of a partial cross-section of a hub and spoke structure according to an embodiment of the disclosure.
FIG. 4 is a side cross section view of a hub and spoke structure according to an embodiment.
FIG. 5 is a side cross section view of a hub and spoke structure according to an embodiment.

As shown in FIGS. 3-5, the extrusion can integrate opposite spokes to form an assembled structure that eliminates the need for a center piece.

FIG. 3 shows a spoke 308 connected to a center hub 312 using mechanical joining in which bolt holes 330 in the hub 312 align with bolt holes 334 in the spoke 308. The spoke includes outer and inner faces 304 and 305 and 306 and 307 and an internal truss member 310 transversely positioned relative to the planes of the outer and inner faces 304 and 306. The interface 338 engages a similarly shaped interface on the rim (not shown).

FIG. 4 shows a spoke 408 connected to a center hub 412 using a twofold form/press fit with center lock mount to the vehicle. In the form fit and press fit interface an interference fit, also known as a press fit or friction fit, fastens between two tight fitting mating parts that produces a joint which is held together by friction after the parts are pushed together. The interference fit is employed at the interface 404 between the spoke 408 and center hub 412 and as shown by she free end 402 of the spoke, between the spoke 408 and she rim (not shown). The cross section of the spoke 408 as discussed above, includes planar faces 416, 420, and 428 and planar truss-like members 432 and 436 located interiorly of and transverse to the planes of the inner and outer faces to form plural triangles 440, 444, and 448.

FIG. 5 shows a spoke 508 and center hub 512 connected together using twofold form/press fit with center-lock mount at the interface 516 therebetween. The spoke has a similar construction to the spoke 408.

Center Piece

The center hub provides the mounting base and assembly characteristics for the spokes. Depending on the assembly method the center piece provides the appropriate weld geometry, screw or riveting characteristics or looking features when a weld free assembly is applied The joining of centerpiece-to-spoke is preferably performed from the "brake-side" (or wheel inner side), whereas the sequence of the individual joints and the dimensions of the fastening elements become critical as limited accessibility from the brake-side to the curbside spoke-arm in FIGS. 3-5. The joining can be also done from the curbside (or wheel outer side), whereas a decorative rivet, screw is used, or a flow or friction weld is finished by machining or other methods. The centerpiece-spoke locking feature can be secured by a subsidiary lock up mechanism. For example, the interlocking feature as shown in FIGS. 6 and 7A-B.

Figures 6, 7A, 7B:
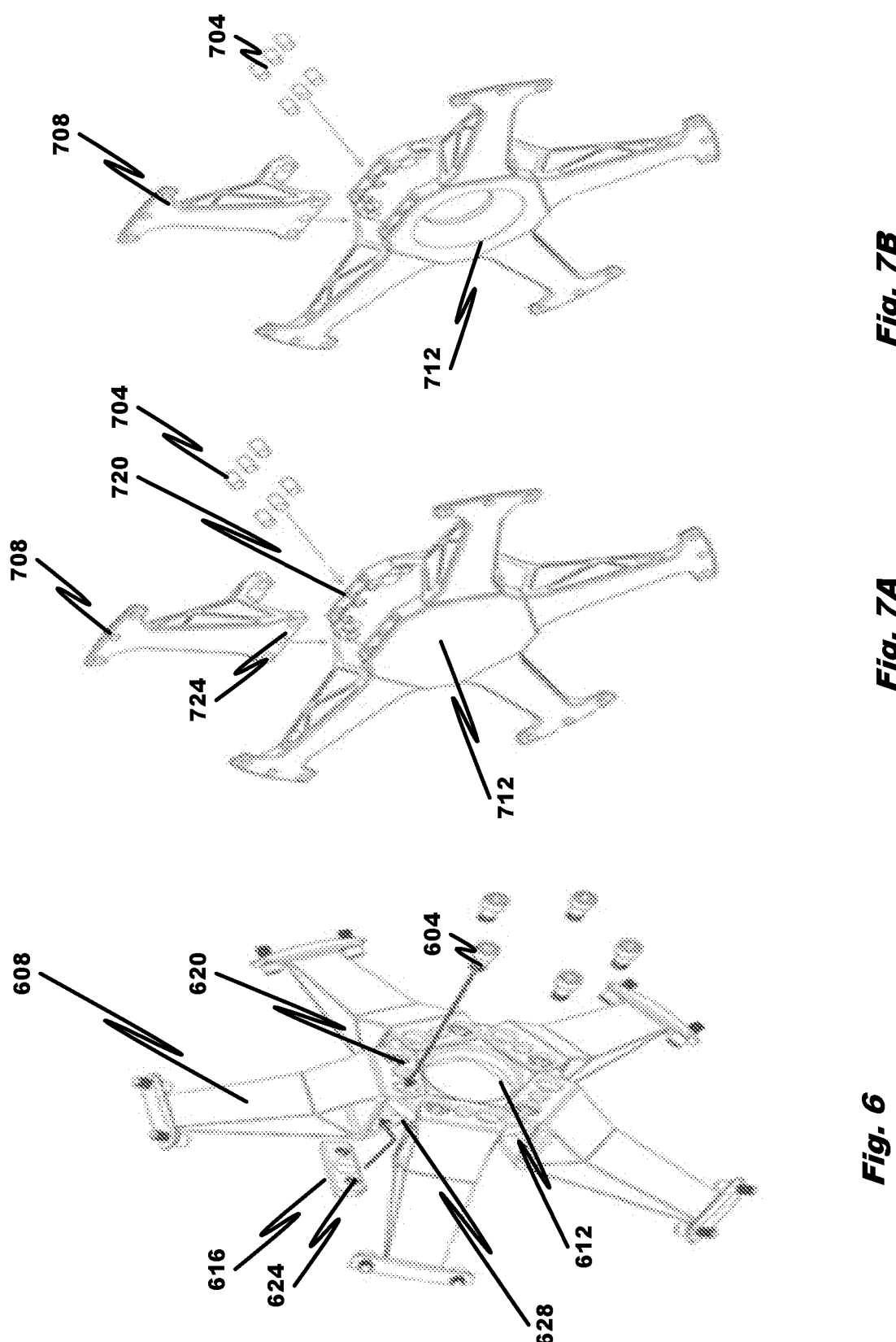
FIG. 6 is a perspective view of a hub and spoke structure according to an embodiment.
FIG. 7A is a front perspective view of a hub and spoke structure according to an embodiment.
FIG. 7B is a rear perspective view of a hub and spoke structure according to an embodiment.

FIG. 6 shows twofold form/press fit in which a plurality of spokes 608 connected to a center hub 612 using bolts 604 and rear plate 616 comprising female holes 624 which align with female holes 620 in the spoke and hub to receive the threaded ends of the bolts. The plate is received in the triangular area 628 at the interface of the spoke and center hub.

The assembly of the locking elements in FIGS. 7A-B (FIG. 7A shows twofold form/press fit and FIG. 7B shows twofold form/press fit with center-lock mount to vehicle) might be supported by shrinking or expending one element by cooling or heating. For example, the pins 704 (which are received in holes 720 in the hub that align with holes 724 in the spoke can be cooled in a liquid ($CO_2$, nitrogen or liquid air) before assembly with the spoke 708 and hub 712. The internal stresses generated by interference fits of larger geometries can be controlled by tolerance management. In case, a press fit creates disproportionate internal stress concentrations, especially around smaller diameter looking pins. The geometrical layout and dimension ratios of the locking components/pins is designed to allow a stress accommodation by applying initial high stresses to enforce adapting creep.

Diverse Spoke Center Hub Assemblies

In this embodiment, the center hub of a pentagon-shaped plate, suitable to accommodate five extruded spokes. The function of the center piece can also be integrated into the spoke extrusion geometry, thereby eliminating a stand-alone center piece. (see FIGS. 8A-C).

Figures 8A, 8B, 8C:
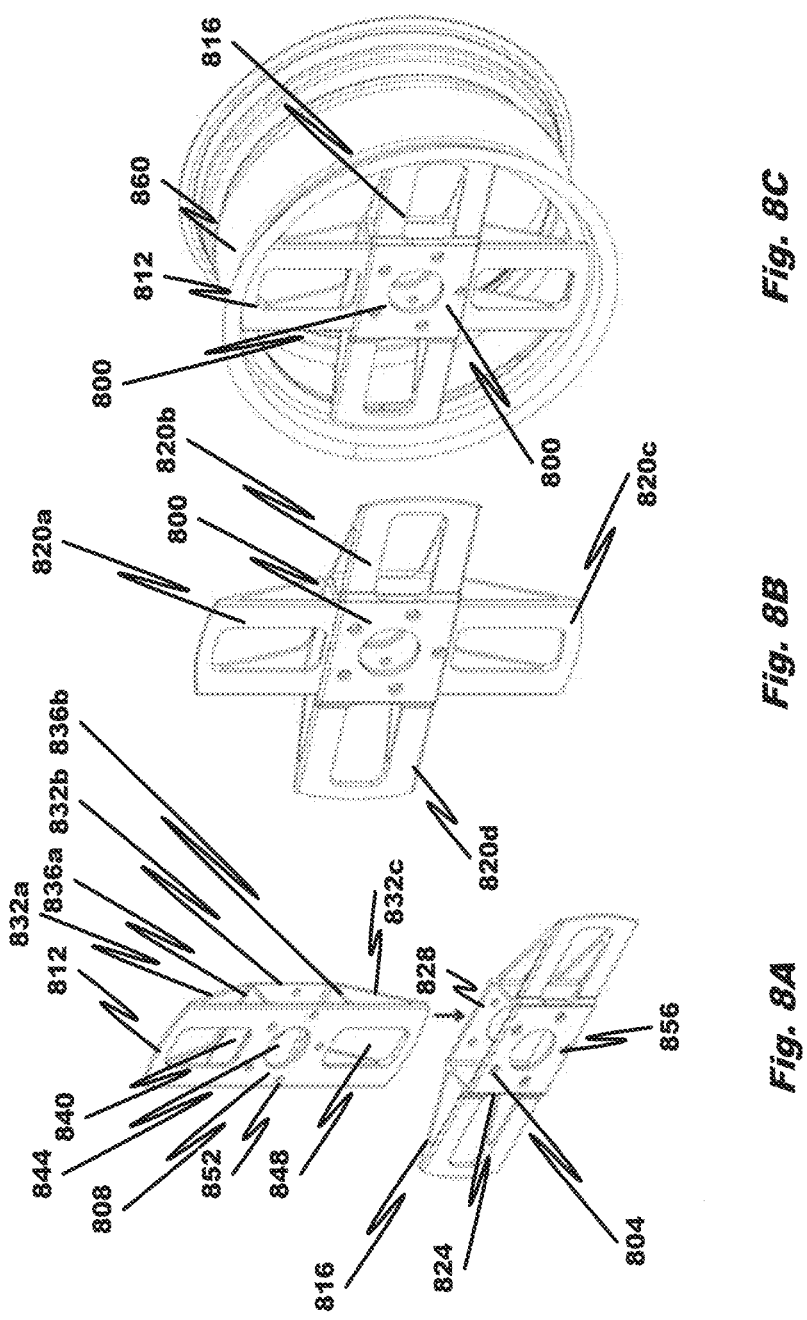
FIG. 8A is an isometric view of a hub and spoke assembly during manufacture according to an embodiment.
FIG. 8B is an isometric view of the assembled hub and spoke assembly of FIG. 8A.
FIG. 8C is an isometric view of the assembled hub and spoke assembly of FIG. 8B installed on a rim.

With reference to FIGS. 8A-C, the center hub 800 is formed by overlapping plates 804 and 808 in first and second hub members 812 and 816, with the nonoverlapping sections 820*a-d* forming the spokes. As can be seen in FIG. 8A, each hub member 812 and 816 comprises base and top plates 824 and 828, with the top plate 828 having first, second, and third sections 832*a-c*. The first section 832*a* forms a first acute triangle 840 with the base plate and a first interior support member 836*a*; the second section 832*b* forms a rectangle 844 with the first and second interior support members 836*a,b*; and the third section 832*c* forms a second acute triangle 848 with the base plate and the second interior support member 836*b*. The exterior height and width of the first hub member 812 is less than an interior height and width of the rectangle formed in the second hub member 816 to enable the first hub member 812 to be received in the rectangle as shown in FIGS. 8A and B. Matching bolt holes 852 and 856 in the first and second hub members 812 and 816 receive bolts to fasten the members together. The fully assembled wheel is shown in FIG. 8C and includes the first and second hub members 812 and 816 engaged with the outer rim 860.

In the basic design, the integrated spoke consists of one, three, or more chambers (e.g., the first and second triangles 840 and 848 and rectangle 844 form three dimensional volumes (e.g., triangle prisms for the first and second triangles 840 and 848 and rectangular prism for the rectangle) preferably fabricated in an extrusion process. However, roll forming, rotary forming, or a sheet metal bending operation can be applied alternatively. A forming process can be applied to modify the geometry.

The first and second triangular shaped chambers 840 and 848 might be subdivided into smaller triangular shaped chambers to optimize the load path for radial fatigue, cornering fatigue or crash requirements on the specific wheel application. The first and second triangular shaped chambers can be kinked similar to the 5-spoke wheel of FIGS. 1A-B, 2A-, and 3-5 to provide clearance for a brake system.

The layout pictured in FIGS. 8A-C might be also engineered in six instead of the described four spokes. Other even numbers of spokes could also be envisioned using this layout.

Hub Free Assembly

Figures 9A, 9B, 9C:
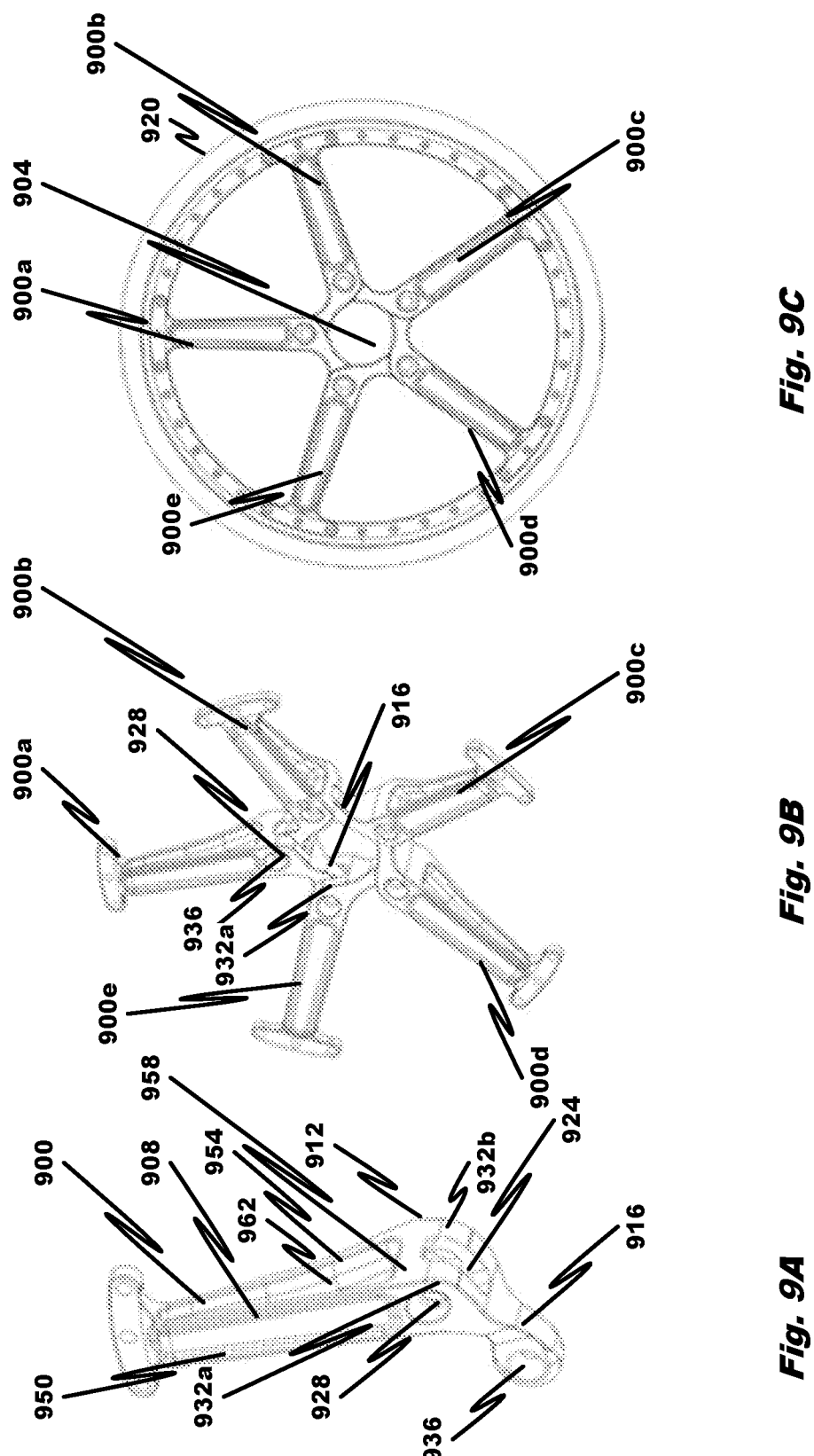
FIG. 9A is an isometric view of a spoke member according to an embodiment.
FIG. 9B is an isometric view of an assembled hub and spoke assembly using the spoke member of FIG. 9A.
FIG. 9C is an isometric view of the assembled hub and spoke assembly of FIG. 9B installed on a rim.

The design comprises individual spokes, preferably a multiple of the number of lug nuts/bolts. The center-side legs of the five spokes forming an integrated "hub" which provides the mounting base of the wheel. The spokes can overlap in various ways to provide the wheel mounting area. For example, with reference to FIGS. 9A-C, the overlap of the spokes 900*a-e* to form a hub 904 could be in a three-layered insert style (FIGS. 9A-B) or designed as a two-layered overlap (FIG. 9C). A three layered insert refers to a fork kind of insert whereas the middle leg lays between two outer legs. A two layer insert refers to an arrangement of only two legs next to each other.

Figure 11B:
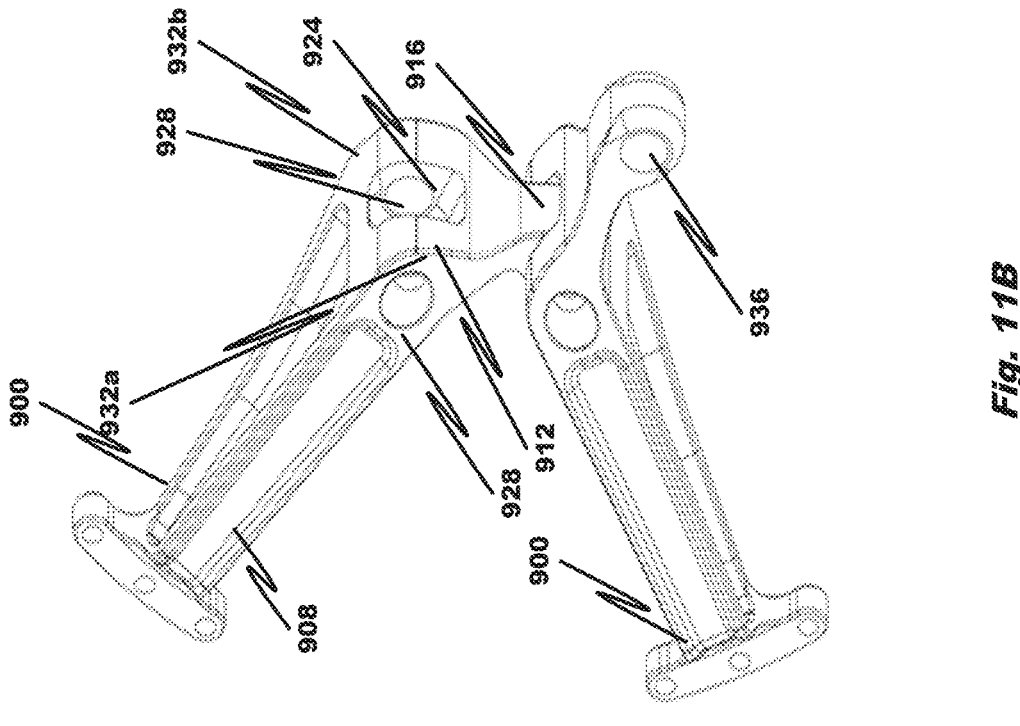
FIG. 11B is a right-side perspective view showing the interlocking engagement of first and second spoke members using the spoke member of FIG. 9A.
Figure 11A:
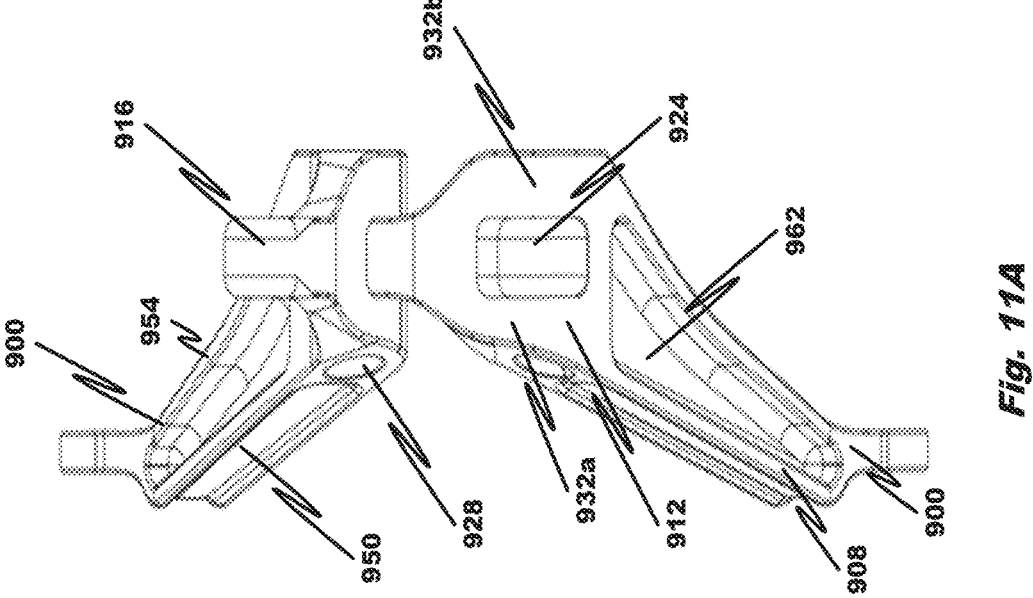
FIG. 11A is an end view showing the interlocking engagement of first and second spoke members using the spoke member of FIG. 9A.
Figure 11C:
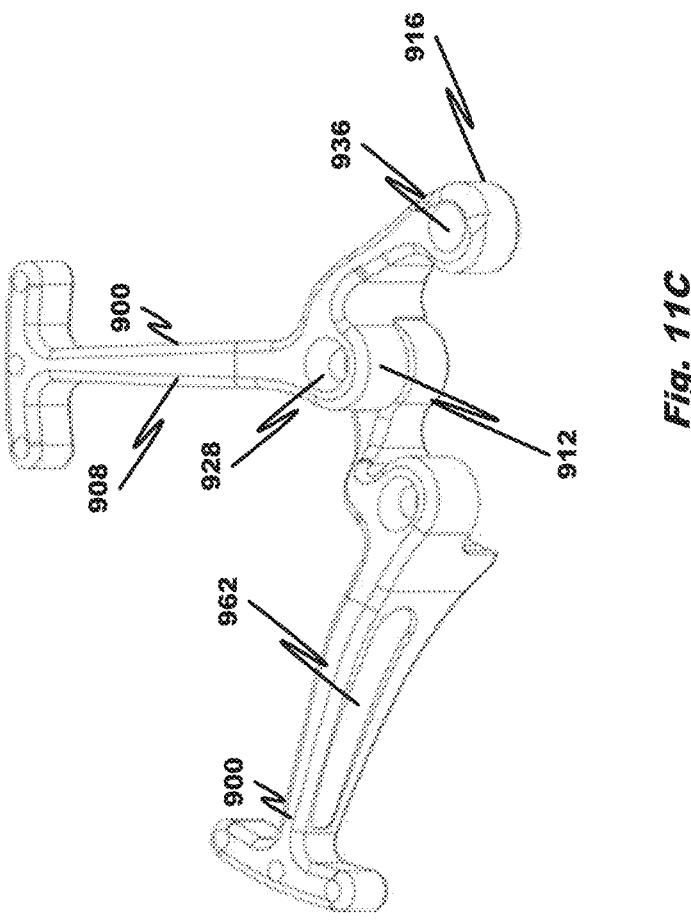
FIG. 11C is a front-side perspective view showing the engagement of first and second spoke members using the spoke member of FIG. 9A.
Figures 11D, 11E:
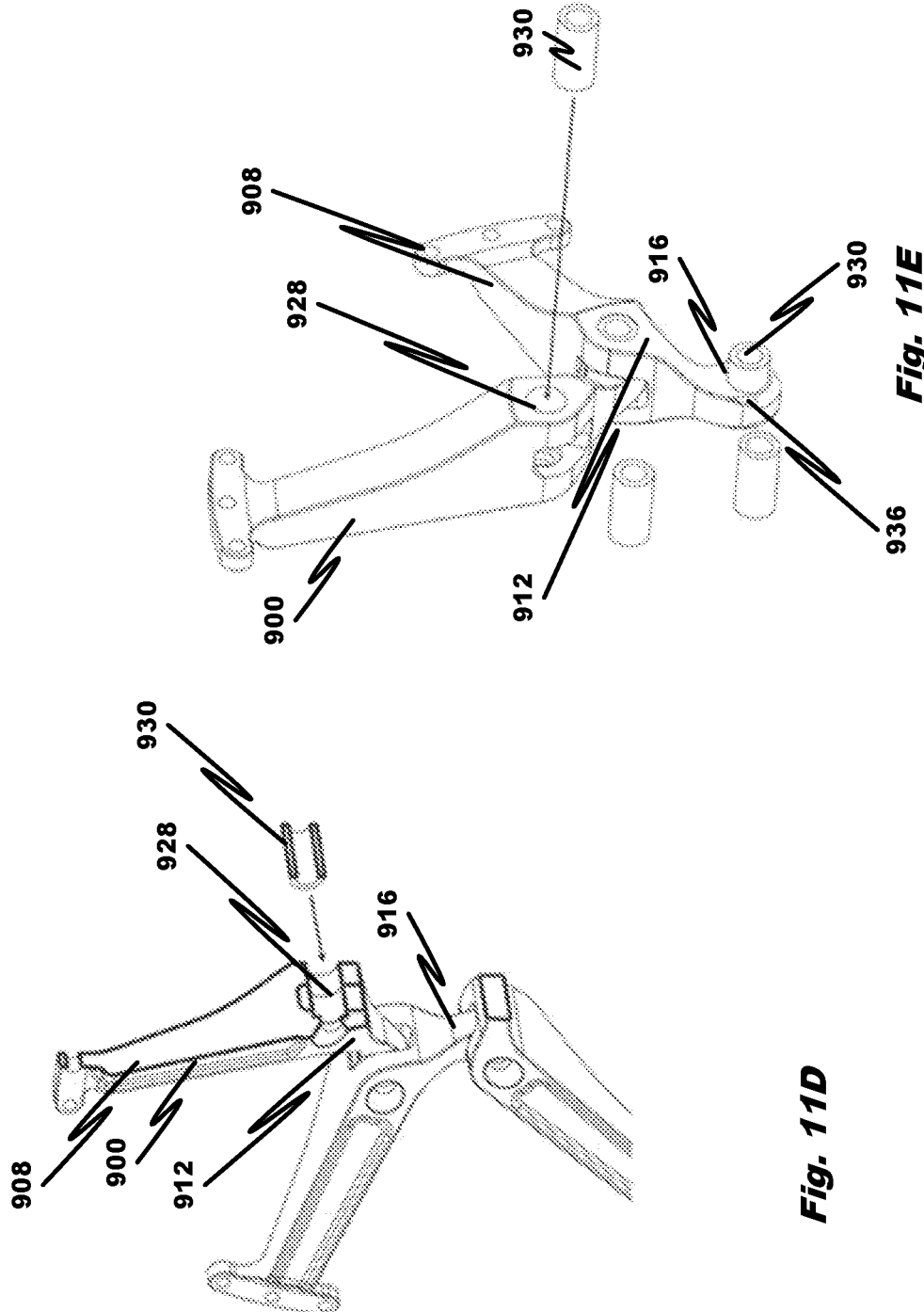
FIG. 11D is a right-side perspective view and partial cross section showing the interlocking engagement of first and second spoke members using the spoke member of FIG. 9A.
FIG. 11E is a left-side perspective view showing the interlocking engagement of first and second spoke members using the spoke member of FIG. 9A.

More specifically, as shown in FIGS. 9A and 11A-E a spoke 900 comprises first, second, and third sections 908, 912, and 916. The first section 908 attaches to the rim 920, the second section 912 receives in an interior space or slot 924 a third section 916 of a different spoke 900 such that fastener holes 928 in opposing arms 932*a-b* of the second section 912 align with a fastener hole 936 in the third section 916, and the third section 916 is so engaged with the second section 912 of another spoke. As can be seen in FIG. 9A, outer and inner and base surfaces 950, 954, and 958 of the spoke form a triangular prism-type volume 962. FIGS. 11D-E show fixing pins 930 concentric with wheel bolts/lug nuts.

Any individual spoke 900 is thus secured relative to any adjacent spoke 900 by the existing wheel mounting fastener system and the friction between contact surfaces. In addition, a hollow pin 930 that is located concentric with the lug nut/wheel bolt location. The pins 930 can be press fit or bonded into the spokes with adhesives. The pins primarily aid in two ways. First, to prevent any relative motion between the spokes. Second, to transmit transverse and longitudinal forces between the spokes more evenly (FIG. 11D-E).

The spokes can be extruded, forged, roll-formed or casted in metal or reinforced plastics. Preferred solution are Al-extrusions because of best cost/performance ratio. However other material/process selections are favorable for special requirements.

The spokes are extruded in the direction of the wheel axis. This extrusion press direction minimizes the required milling work for the rim-spoke mounting and increases the contact area to join the spokes to the rim. The extrusion is pressed with solid, hollow, or semi-hollow cross-sectional shapes depending on visual and structural requirements.

Figures 10A, 10B, 10C:
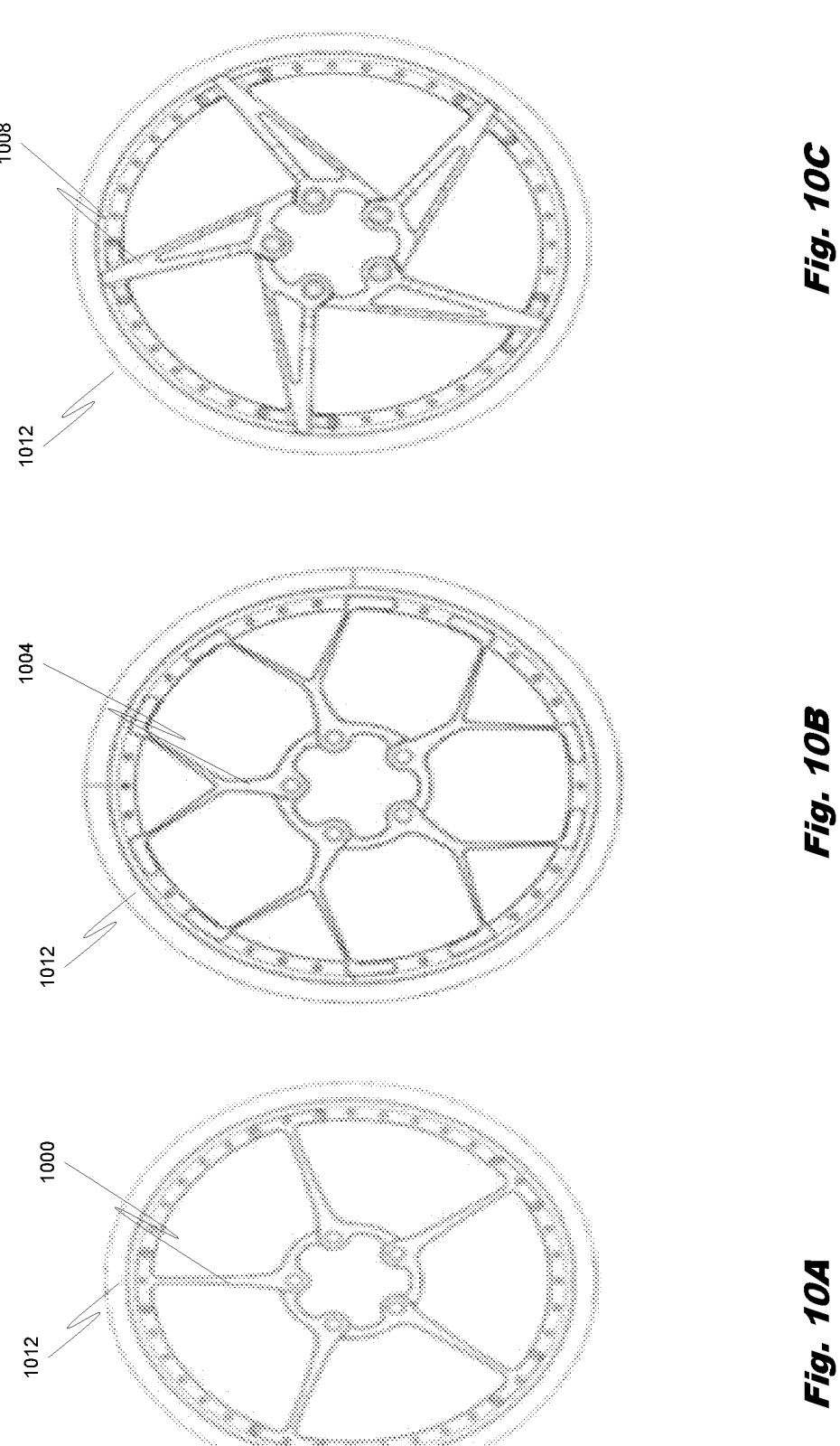
FIG. 10A shows a wheel assembly using a spoke member similar to FIG. 9A in accordance with an embodiment.
FIG. 10B shows a wheel assembly using a spoke member similar to FIG. 9A in accordance with an embodiment.
FIG. 10C shows a wheel assembly using a spoke member similar to FIG. 9A in accordance with an embodiment.

In an exemplary version, the spoke design can be radial from the center to the wheel rim (as shown in FIGS. 9A-C) or more complex shaped as shown in FIG. 10A with the spokes 1000 being in a I-shape design, as shown in FIG. 10B with the spokes 1004 being in an extrusion contour in Y-shape, or as shown in FIG. 10C with the spokes 1008 being in an asymmetric V-shape towards the rim 1012.

The "V" or "Y" shape of FIGS. 10B and C can improve the load path in specific fatigue modes (acceleration, deceleration), extend further the contact length to the rim 1012 which is favorable for welding and open aesthetic design options. The asymmetric extrusion types could include hollow structures where one spoke connects two mounting holes with the rim. The asymmetric spoke design would cause optical effects depending on where the wheel is mounted, on the left and right side of the car.

Referring to FIGS. 9 and 11A-C, a "Delta Beam" spoke is described which combines the delta concept with a conventional "I-Beam" geometry. The inner lamella supports the triangle geometry particular in 13° curb impact. This wheel type would support the use of lower strength materials like reinforced composites or castings. The five spokes in FIGS. 11A-E weigh 1.88 Kg in total for 640 Kg wheel load made from Al 6061 wrought alloys.

As common to assemblies operating under cyclical load cases, components in fabricated wheel are subject to fretting corrosion. Therefore motion must be minimized to ensure no degradation of performance. To minimize relative motion between components optional welding, brazing, adhesives or additional mechanical fastening can be applied. In addition surface conditioning can reduce the build-up of fretting corrosion. This can be achieved by anodized (low or high voltage), shot or Laser peening or electropolishing.

Rim Ring

The rim is engineered in a conventional design. Depending on the spoke type the rim reveals geometrical characteristics to accommodate the outward edge of the spoke. The wheel-rim might incorporate 1) an accommodating forming element, 2) a seating flange or 3) a sealed cut off in the rim. The mounting methods might include press fit, a form fit or a combination of both. The form/press fit might be secured by adhesive or a locking weld.

The assembly can also be accomplished in a welded structure, where rim and spoke form a suitable geometry for fusion or friction type of welds. The rim-side geometrical weld preparation might be a flange formed inside or outside the radial direction. Another option is welding thru the rim ring itself without providing flange.

The fusion/friction type of weld can be combined with a form fit to distribute the load in an appropriate way. For example, it can be an undercut L-shape or dove-tail joint geometry. The optimized load path in the surrounding area of the weld reduces the stress in the weld seam and the heat affected zone of the weld.

Special features might be not needed if the spoke is manufactured to fit in a circular standard rim.

The rim-spoke assembly might be mechanically, e.g., by screws, flow drilling or any other mechanical means. The mechanical joint can be against a flange provided by the rim or through the rim itself.

Hub Cap

The spokes might accommodate a hub cap to balance the load distribution, improve aerodynamics and to allow additional aesthetic features. The cap might be a formed stamping and can mechanically joined or welded. The material can be metal, reinforced composite or laminates.

Alternatively, the spoke-structure can be integrated in an injection mold process. The metal spoke is incorporated in a composite cap within the tool. A heavy duty hub-cap could protect wheel and tires against explosion or bullets. The hup-cap might include a bullet proof material, reinforced composite or laminate.

The oversized disc is preferably mechanically attached to the spokes to allow fast exchange. In regard to a bullet proof wheel, the attachment of rim and spoke are preferably mechanical to exchange the individual wheel modules.

The exemplary systems and methods of this disclosure have been described in relation to inner wheel structures.

However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure is grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A wheel assembly, comprising:
a circular rim;
a center hub positioned at an axis of rotation of the circular rim; and
a plurality of spokes radiating outwardly from the center hub to the circular rim,
wherein each spoke of the plurality of spokes is removably connected to the circular rim,
wherein each spoke of the plurality of spokes comprises a generally triangular prism formed by first and second surfaces of the respective spoke and a support member extending transversely between the first and second surfaces,
wherein a first spoke of the plurality of spokes comprises a first center hub section, wherein a second spoke of the plurality of spokes comprises a second center hub section, and wherein the second center hub section comprises a central channel to which the first center hub section engages to position the first and second center hub sections in an overlapping relationship.

2. The wheel assembly of claim 1, wherein the support member is part of the center hub.

3. The wheel assembly of claim 1, wherein the center hub is at least partially formed by the interconnected first and second center hub sections of the first and second spokes.

4. The wheel assembly of claim 1, wherein the generally triangular prism includes an irregularity forming a stress riser having a lower breaking point than a breaking point of other surfaces defining the generally triangular prism.

5. The wheel assembly of claim 1, wherein one or more surfaces of the generally triangular prism comprise a surface treatment selected from a group consisting essentially of a coating, a paint, anodizing, electropolishing or shot peening and laser peening, and wherein the plurality of spokes attach to the center hub by a form press/fit scheme.

6. A wheel assembly, comprising:
a circular rim;
a center hub positioned at an axis of rotation of the circular rim; and
a plurality of spokes radiating outwardly from the center hub to the circular rim,
wherein each spoke of the plurality of spokes is removably connected to the circular rim,
wherein each spoke of the plurality of spokes comprises a space located interiorly of first and second surfaces of the respective spoke and a support member extending transversely between the first and second surfaces, the interior space having a generally triangular cross section along a length of the respective spoke, and
wherein a selected spoke of the plurality of spokes comprises:
a first section connecting to the circular rim;
a second section; and
a third section connecting to a first adjacent spoke of the plurality of spokes,
wherein the second section is positioned between the first and third sections, wherein the second section connects to a second adjacent spoke of the plurality of spokes, and wherein the second section comprises a slot to receive a third section of the second adjacent spoke.

7. The wheel assembly of claim 6, wherein the support member is part of the center hub.

8. The wheel assembly of claim 6, and wherein the center hub is at least partially formed by the interconnection between the third section of the selected spoke and the first adjacent spoke and by the interconnection between the second section of the selected spoke and the second adjacent spoke.

9. The wheel assembly of claim 6, wherein the interior space includes an irregularity forming a stress riser having a lower breaking point than a breaking point of other surfaces defining the interior space.

10. The wheel assembly of claim 6, wherein one or more surfaces of the interior space comprises a surface treatment selected from a group consisting essentially of a coating, a paint, anodizing, electropolishing or shot peening and laser peening, and wherein the plurality of spokes attach to the center hub by a form press/fit scheme.

11. A wheel assembly, comprising:
a circular rim; and
a plurality of spokes radiating outwardly from an axis of rotation of the wheel assembly,
wherein each spoke of the plurality of spokes is removably connected to the circular rim and to adjacent spokes to form hub,
wherein each spoke of the plurality of spokes comprises a space located interiorly of first and second surfaces of the respective spoke and a support member extending transversely between the first and second surfaces, the interior space having a generally triangular cross section along a length of the respective spoke, and
wherein a selected spoke of the plurality of spokes comprises:
a first section connecting to the circular rim;
a second section; and
a third section connecting to a first adjacent spoke of the plurality of spokes,
wherein the second section is positioned between the first and third sections, wherein the second section connects to a second adjacent spoke of the plurality of spokes, and wherein the second section comprises a slot to receive a third section of the second adjacent spoke.

12. The wheel assembly of claim 11, wherein an adhesive is applied to adjacent spokes of the plurality of spokes which reduces relative motion and fretting corrosion between the adjacent spokes of the plurality of spokes.

13. The wheel assembly of claim 11, wherein the interior space includes an irregularity forming a stress riser having a lower breaking point than a breaking point of other surfaces defining the interior space.

* * * * *